Patented Jan. 23, 1951

2,538,963

UNITED STATES PATENT OFFICE 2,538,963

PREPARATION OF CUPRIC d-PENICILLOATE-G

James D. Dutcher and Jack Bernstein, New Brunswick, N. J., and Martin Dexter, Brooklyn, N. Y., assignors to E. R. Squibb & Sons, New York, N. Y., a corporation of New York No Drawing. Application December 21, 1945, Serial No. 636,502

3 Claims. (Cl. 260—302)

This invention relates to, and has for its object the provision of, d(delta)-penicilloic acid G and functional derivatives thereof. The designation "d(delta)" directly preceding the term "penicilloic" (or "penicilloate") herein indicates that the stereoisomeric form of the penicilloic acid residue is the same as the stereoisomeric form of the penicilloic acid residue of the compound formed by the interaction of sodium-penicillin G and cupric sulfate in water, such designation having been accepted by the interested chemical research groups in this country. The compounds of this invention are potential intermediates for the synthesis, and precursors in the mold production, of penicillin and related chemotherapeutic agents.

Penicilloic acid G has the following structural formula:

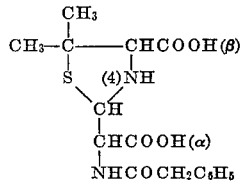

The penicilloic acid G residue referred to herein is therefore

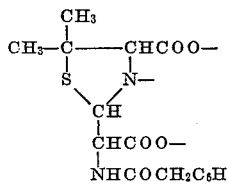

The compounds specifically described herein, and to which the invention especially relates, are those of the general formula:

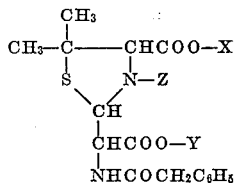

wherein X and Y each represent a member of the class consisting of H and hydrocarbon (especially, lower-alkyl) groups, Z represents a member of the class consisting of H and acyl (especially, aroyl) groups, and the penicilloic acid residue is of the aforementioned d(delta) stereoisomeric form.

A copper salt of d(delta)-penicilloic acid G has been obtained by the treatment of sodium-penicillin G with aqueous cupric sulfate. It is believed that the initial reaction is a Cu-catalyzed hydrolysis (degradation) to the d($\alpha$) acid, which is then isomerized. The cupric d(delta)-penicilloate G may be prepared from d(gamma)-penicilloic acid G, as well as from d($\alpha$)-penicilloic acid G, by treatment with aqueous cupric sulfate. The free acid, d(delta)-penicilloic acid G, may be prepared from the cupric d(delta)-penicilloate G by treatment with hydrogen sulfide; and from this free acid, various esters and other functional derivatives may be obtained. Thus, a di-ester of d(delta)-penicilloic acid G may be prepared by treating the free acid with a diazomethane (e. g., diazomethane or phenyl-diazomethane); an N$^4$-acyl derivative may be prepared from a di-ester of d(delta)-penicilloic acid G by treatment with an acyl chloride (e. g., acetyl chloride or benzoyl chloride); and a $\beta$(mono) ester of d(delta)-penicilloic acid G may be prepared by partial saponification of a di-ester of d(delta)-penicilloate G.

Preferably, the d(gamma) or d($\alpha$)-penicilloic acid G converted to the d(delta) stereoisomer is one which has been purified by conversion to the lead salt, purification of the lead salt, and reconversion to the free acid.

The following examples are illustrative of the invention:

EXAMPLE 1

*Cupric d(delta)-penicilloate G*

140 mg. crystalline sodium-penicillin G (cf. Wintersteiner et al. application Serial No. 540,140, filed June 13, 1944, now Patent No. 2,461,949, dated February 15, 1949) is dissolved in 10 ml. water, and a 20% aqueous solution of cupric sulfate is added gradually. After 1.0 ml. has been added, a nearly-colorless precipitate begins to form, which soon turns grayish-green (and further addition produces no apparent change). An hour later, the precipitate is removed by filtration; and the deep-blue filtrate, on standing for 12–16 hours, deposits bright-blue crystals, which are collected, washed with water, and dried. The product decomposes at 170–172° C.; and its analysis (C, 44.19%; H, 5.02%; N, 6.14%; S, 7.30%; and Cu, 14.35%) is in substantial agreement with that calculated for $C_{16}H_{18}O_5N_2SCu \cdot H_2O$. Thus, the compound is a hydrated cupric salt of a penicilloic acid of the structural formula given hereinbefore, the acid residue being of the d(delta) stereoisomeric form defined hereinbefore.

Recrystallization of the product may be effected either by carefully adding water to a methanol solution thereof, or by dissolving the product in normal $H_2SO_4$ and adjusting the pH to 4 by addition of sodium acetate.

EXAMPLE 2

Cupric d(delta)-penicilloate G (a) 760 mg. α-ethyl d(gamma)-penicilloate G [the d(gamma)-isomer being the main, or best crystallizable, constituent of the mixture of α-mono-esters formed in the condensation of d-penicillamine with alkyl-penaldates G] is dissolved in 4.2 ml. normal sodium hydroxide, and the solution is allowed to stand at room temperature for 35 minutes. The reaction mixture is then cooled in an ice bath, and 14 ml. normal acetic acid is added, followed by 20 ml. of a 10% lead acetate solution. The white precipitate formed is washed with normal acetic acid and then with distilled water; and the washed precipitate is suspended in 50 ml. water, and hydrogen sulfide bubbled through the suspension until complete precipitation of the lead has been effected. The lead sulfide precipitate is filtered off, and the filtrate is freeze-dried. The product, d(gamma)-penicilloic acid G, melts at 110–115° C. (yield 465 mg.).

(b) 250 mg. d(gamma)-penicilloic acid G is dissolved in 13 ml. water, and a 20% aqueous solution of cupric sulfate is added gradually. Without the intermediate formation of the amorphous precipitate obtained in the reaction with sodium-penicillin G described in Example 1, the deep-blue solution slowly deposits crystals. The precipitate is collected, washed, and dried (yield 232 mg.). After recrystallization from methanol-water (cf. Example 1), the product (120 mg.) melts with decomposition at 168–170° C. Its analysis (C, 44.41%; H, 4.48%; N, 6.36%; and Cu, 14.94%) is in substantial agreement with that calculated for $C_{16}H_{18}O_5N_2SCu \cdot H_2O$. It does not depress the melting point of cupric d(delta)-penicilloate G obtained as described in Example 1; and these products show identical rotation behavior when dissolved in normal sulfuric acid, as well as identical ultraviolet spectra (measured in normal sulfuric acid).

EXAMPLE 3

Cupric d(delta)-penicilloate G (a) Crystalline α-methyl-d(α)-penicilloate G (obtainable by methanolysis of crystalline sodium penicillin G as described in Wintersteiner application Serial No. 636,265, filed December 20, 1945, now Patent No. 2,506,696, dated May 9, 1950) is converted into d(α)-penicilloic acid G by alkaline saponification and purification via the lead salt, as described for the d(gamma) isomer in section (a) of Example 2. The freeze-dried d(α)-penicilloic acid thus obtained is a fluffy product melting at 110–113° C. with decomposition (after softening at 100° C.), and has an $[\alpha]_D^{23}$ of +88.2 (0.68% solution in methanol).

(b) 91 mg. d(α)-penicilloic acid G is dissolved in 10 ml. water, and 165 mg. cupric sulfate in aqueous solution is added. After standing 24 hours at room temperature, the reaction mixture is filtered to recover the crystalline salt (yield 68 mg.). The product melts at 165–168° C., and does not depress the melting point of the cupric d(delta)-penicilloate G obtained as described in Example 2.

EXAMPLE 4 d(Delta)-penicilloic acid G 236 mg. recrystallized cupric d(delta)-penicilloate G is suspended in 25 ml. water; the suspension is chilled in ice, treated with hydrogen sulfide gas for 10 minutes, and filtered; and the filtrate is freeze-dried (yield 150 mg.). The product melts at 111–112° C. with decomposition; and its analysis (C, 53.55%; H, 5.93%; N, 8.12%; and $CO_2$ lost at 110° C., 13.9%) is in good agreement with that calculated for $C_{16}H_{20}O_5N_2S$ (C, 54.55%; H, 5.68%; N, 7.95%; and $CO_2$ lost at 110° C., 12.5%). Thus, the compound is a penicilloic acid of the structural formula given hereinbefore, the acid being of the d(delta) stereoisomeric form defined hereinbefore.

A 0.9% methanolic solution of the product exhibits rapid mutarotation at room temperature, the $[\alpha]_D^{23}$ being −19° after 0.25 hour, +11° after 5 hours, and +74° after 120 hours. When the product is dissolved in water and treated with an aqueous cupric sulfate solution, a crystalline cupric salt identical with the starting material is obtained.

EXAMPLE 5 d(Delta)-penicilloic acid G (a) 0.342 g. α-ethyl d(gamma)-penicilloate G is hydrolyzed with 1.66 ml. 1.087 normal sodium hydroxide solution for 35 minutes. The solution is then cooled, diluted with 10 ml. ice water, and neutralized with 1.79 ml. 1.004 normal sulfuric acid solution; and 5.1 ml. of a 10% copper sulfate solution is added. The solution is allowed to stand for 40 hours (the copper salt precipitating out very slowly); and the precipitate is separated by centrifuging, washed with water, and dried. The cupric d(delta)-penicilloate G thus obtained melts at 162° C. with decomposition (yield 0.31 g.).

(b) 0.2 g. of this cupric d(delta)-penicilloate G is suspended in 30 ml. ice water, and hydrogen sulfide is bubbled through the solution to decompose the copper salt. The copper sulfide precipitate is separated by centrifuging; and the supernate is treated with a small quantity of Darco G-60, filtered, and freeze-dried (yield 90 mg.). The product, d(delta)-penicilloic acid, melts at 112–118° C. with decomposition, and has an $[\alpha]_D^{24}$ of −23.1 (1% ethanol solution); and its analysis (C, 53.23%; H, 5.99%; $CO_2$, 14.04%; and neutralization equivalent, 187) is in good agreement with that calculated for $C_{16}H_{20}O_5N_2S$ (neutralization equivalent, 176). The ultraviolet absorption curve of the product is almost identical with the curve for d(gamma)-penicilloic acid isolated via the lead salt.

EXAMPLE 6

Dimethyl-d(delta)-penicilloate G

A suspension of 0.3 g. d(delta)-penicilloic acid G in anhydrous ether is treated with an ethereal solution of diazomethane until the evolution of nitrogen has ceased and the yellow color of the diazomethane persists. The ether is then removed from the reaction mixture by a current of nitrogen; the residue is dissolved in chloroform; and the solution is centrifuged to remove a small amount of insoluble material, and concentrated to a viscous syrup. On addition of anhydrous ether to this syrup, crystallization occurs. This material, which melts at 80–103° C., is recrystallized twice from a chloroform-ether mixture. The product melts at 111–114° C., and has an $[\alpha]_D^{23}$ of −40° (1% methanol solution); the yield is 145 mg. Analysis of the product (C, 56.55%; H, 6.21%; N, 7.48%, and OCH₃, 16.47%) is in substantial agreement with that calculated for C₁₈H₂₄O₅N₂S (C, 56.84%; H, 6.32%; N, 7.39%, and OCH₃, 16.32%). Thus, the compound is the α,β-dimethyl ester of a penicilloic acid of the structural formula given hereinbefore, the acid residue being of the d(delta) stereoisomeric form defined hereinbefore. A mixed melting point of the product with dimethyl d(gamma)-penicilloate G (melting at 110–110.5° C.) showed a marked depression (to 90–102° C.).

Starting with 1.3 g. d(delta)-penicilloic acid G in the foregoing procedure, and washing the chloroform solution of the reaction product with saturated sodium bicarbonate solution to remove any unreacted acid, the diester obtained melts at 115–117° C., and has an $[\alpha]_D^{25}$ of −43° (1% methanol solution); and the yield is 0.56 g.

EXAMPLE 7

Dimethyl-N⁴-benzoyl-d(delta)-penicilloate G 200 mg. dimethyl d(delta)-penicilloate G is dissolved in 5 ml. anhydrous benzene and 1.28 g. dimethyl aniline; and a solution of 0.67 g. benzoyl chloride in 2 ml. benzene is added dropwise, and the reaction mixture is allowed to stand at room temperature for 48 hours. The reaction mixture is then diluted with benzene, washed successively with saturated sodium bicarbonate solution, with 5% hydrochloric acid, with saturated sodium bicarbonate solution, and with saturated sodium chloride solution. The benzene solution is then dried over sodium sulfate, and concentrated at room temperature to an oil. The excess benzoyl chloride is decomposed by heating with aqueous pyridine on the steam bath for five minutes; the mixture is then extracted with benzene; and the benzene extract is washed with dilute hydrochloric acid, with saturated sodium bicarbonate solution, and then with saturated sodium chloride solution. The benzene solution is then dried over sodium sulfate, and concentrated under reduced pressure to an oil.

The oil is dissolved in benzene, and hexane is added until the solution becomes cloudy. The solution is then chromatographically adsorbed on an alumina column, and the column is then eluted successively with hexane, hexane-ether mixture, ether, ether-chloroform mixture, chloroform, and methanol. The methanol eluate is concentrated; and the oil obtained is granulated by trituration with hexane. The solid, after crystallization from a mixture of ether and hexane, melts at 109–110° C. (yield 135 mg.); and recrystallization from ether raises the melting point to 110–110.5° C. Its $[\alpha]_D^{25}$ is +26.6° (0.94% methanol solution); and its analysis (C, 61.60%; H, 5.79%; and N, 5.93%) is in substantial agreement with that calculated for C₂₅H₂₈O₆N₂S (C, 61.98%; H, 5.78%; and N, 5.78%). Thus, the compound is the α,β-dimethyl ester, N⁴-benzoyl amide of a penicilloic acid of the structural formula given hereinbefore, the acid residue being of the d(delta) stereoisomeric form defined hereinbefore.

EXAMPLE 8

β-Methyl-d(delta)-penicilloate G 380 mg. dimethyl d(delta)-penicilloate G is dissolved in 10 ml. methanol, and 9.5 ml. 0.105 normal sodium hydroxide solution is added dropwise over a period of 90 minutes. The hydrolysis mixture is allowed to stand for 12–16 hours at room temperature, and is then evaporated to dryness at room temperature by reduced pressure. The residue is dissolved in 20 ml. saturated sodium chloride solution, and filtered; and the filtrate is cooled to 0° C., 9.8 ml. of 0.102 normal hydrochloric acid is added, and the solution is extracted with three 20 ml. portions of chloroform. The (combined) extract is dried over magnesium sulfate, and concentrated under reduced pressure; and the remaining syrup is dissolved in benzene and freeze-dried. The product, β-methyl-d(delta)-penicilloate G, obtained in a yield of 275 mg., is a white powder having an $[\alpha]_D^{25}$ of +4° (0.5% methanol solution), which changes to +10° in 5 hours and to +25° in 24 hours. Its analysis (C, 55.07%; and H, 6.10%) is in substantial agreement with that calculated for C₁₇H₂₂O₅N₂S (C, 55.74%; and H, 6.01%). Thus, the compound is the β-methyl ester of a penicilloic acid of the structural formula given hereinbefore, the acid residue being of the d(delta) stereoisomeric form defined hereinbefore.

The invention may be variously otherwise embodied within the scope of the appended claims.

We claim:

1. The method which essentially comprises interacting d(gamma)-penicilloic acid G with cupric sulfate in water.

2. The method which essentially comprises interacting d(α)-penicilloic acid G with cupric sulfate in water.

3. The method which essentially comprises interacting a member of the group consisting of d(gamma)-penicilloic acid G and d(α)-penicilloic acid G with cupric sulfate in water.

JAMES D. DUTCHER.
JACK BERNSTEIN.
MARTIN DEXTER.

REFERENCES CITED

The following references are of record in the file of this patent:

Abraham et al., "The British Journal of Ex'pts Pathology," vol. 23, June 1942, pages 111 and 112.

Pfizer Report, CMR–P–IX, April 4, 1944, page 3.

Progress Report, Synthesis of Penicillin Squibb Institute, November 1, 1944, pages 1–13.

Squibb Report, CMR–S–36, January 1, 1945, pp. 23 and 24.

Fleming, "Penicillin" (1946), p. 29.

Chain, "Annual Review of Biochemistry," 1948, pp. 673, 701.

The Chemistry of Penicillin, Princeton U. Press, 1949, pp. 542, 550 and 577.